US010291314B2

(12) United States Patent
Dowlatkhah et al.

(10) Patent No.: US 10,291,314 B2
(45) Date of Patent: May 14, 2019

(54) METHOD AND SYSTEM TO DYNAMICALLY IDENTIFY AND CONTROL A UAV WITH EMITTING INSTRUMENTS

(71) Applicant: AT&T Intellectual Property I, L.P., Atlanta, GA (US)

(72) Inventors: Sangar Dowlatkhah, Alpharetta, GA (US); Zhi Cui, Sugar Hill, GA (US); Venson Shaw, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/921,019

(22) Filed: Mar. 14, 2018

(65) Prior Publication Data

US 2018/0205446 A1    Jul. 19, 2018

Related U.S. Application Data

(63) Continuation of application No. 15/209,868, filed on Jul. 14, 2016, now Pat. No. 9,954,599.

(51) Int. Cl.
*H04W 8/24* (2009.01)
*B64C 39/02* (2006.01)
(Continued)

(52) U.S. Cl.
CPC ....... *H04B 7/18506* (2013.01); *B64C 39/024* (2013.01); *B64D 47/00* (2013.01); *G01S 17/08* (2013.01); *G01S 17/42* (2013.01); *H04W 8/18* (2013.01); *G01S 17/58* (2013.01); *H04W 84/042* (2013.01)

(58) Field of Classification Search
CPC .......... H04W 8/18; H04W 8/20; H04W 8/22; H04W 8/24; H04B 7/18506; B64C 39/024
See application file for complete search history.

(56) References Cited

U.S. PATENT DOCUMENTS 6,908,061 B2    6/2005 Akahori et al.
7,127,334 B2    10/2006 Frink
(Continued)

FOREIGN PATENT DOCUMENTS

| CN | 104834317 A | 8/2015 |
| JP | 11-231936 A | 8/1999 |
| JP | 2000-211593 A | 8/2000 |

*Primary Examiner* — Christopher M Brandt
(74) *Attorney, Agent, or Firm* — BakerHostetler

(57) ABSTRACT

A system and methodology to dynamically identify and control a UAV with a beam instrument is provided. Specifically, each UAV is provided with a telecommunication module. User equipment is provided with a beam device capable of measuring the distance, speed and location of a UAV. The user equipment is coupled to a command and control center through a command and control center network that can access a data store storing information about UAVs. Identification of the UAV is obtained through a telecommunication network that communicates with the telecommunication module to obtain location information and identity information for each telecommunication module associated with a UAV. The command and control center acquires the identity information and correlates the identity information with FAA register information from an FAA network. Identification of the target UAV is then communicated to the user equipment.

17 Claims, 6 Drawing Sheets

(51) Int. Cl.
  *H04B 7/185* (2006.01)
  *H04W 8/18* (2009.01)
  *B64D 47/00* (2006.01)
  *G01S 17/42* (2006.01)
  *G01S 17/08* (2006.01)
  *H04W 84/04* (2009.01)
  *G01S 17/58* (2006.01)

(56) References Cited

U.S. PATENT DOCUMENTS

| | | | |
|---|---|---|---|
| 9,102,406 | B2 | 8/2015 | Stark et al. |
| 9,129,520 | B2 | 9/2015 | Limbaugh et al. |
| 9,417,325 | B1* | 8/2016 | Bry .................... G01S 13/9303 |
| 2006/0167599 | A1 | 7/2006 | Bodin |
| 2008/0212503 | A1* | 9/2008 | Lipford .................. H04W 8/24 370/310 |
| 2013/0128777 | A1* | 5/2013 | Garcia Azorero ...... H04W 4/70 370/259 |
| 2014/0032021 | A1 | 1/2014 | Metzler et al. |
| 2014/0098990 | A1 | 4/2014 | Vian et al. |
| 2015/0105075 | A1* | 4/2015 | Yu ........................... H04W 8/18 455/435.2 |
| 2015/0338855 | A1 | 11/2015 | Stark et al. |
| 2016/0059962 | A1 | 3/2016 | Abuelsaad et al. |
| 2016/0076892 | A1 | 3/2016 | Zhou et al. |
| 2016/0125740 | A1* | 5/2016 | Pasko ................... G08G 5/0034 701/528 |
| 2016/0244176 | A1* | 8/2016 | Xiao ........................ B60L 7/10 |
| 2016/0360361 | A1* | 12/2016 | Ross ...................... H04W 4/023 |
| 2017/0092138 | A1* | 3/2017 | Trundle ................ B64C 39/024 |
| 2017/0208456 | A1* | 7/2017 | Noldus ............... H04L 67/1097 |
| 2017/0278404 | A1* | 9/2017 | Gordon ................ G08G 5/006 |
| 2017/0278410 | A1* | 9/2017 | Byers ................... B64C 39/024 |
| 2017/0301220 | A1* | 10/2017 | Jarrell ..................... H04W 4/70 |
| 2017/0364065 | A1* | 12/2017 | Petruzzelli ............ B64C 39/024 |
| 2018/0068567 | A1* | 3/2018 | Gong .................... H04W 4/022 |
| 2018/0197420 | A1* | 7/2018 | Banga ..................... G01S 13/78 |

* cited by examiner

METHOD AND SYSTEM TO DYNAMICALLY IDENTIFY AND CONTROL A UAV WITH EMITTING INSTRUMENTS

TECHNICAL FIELD

The present disclosure relates generally to identification of unmanned aerial vehicles (UAVs), and more particularly to methods and systems for dynamically identifying UAVs with emitting instruments.

BACKGROUND

UAVs are presently used for a variety of purposes, including military and commercial applications, as well as for recreation by hobbyists. Commercial UAVs can be used in the realm of public safety, including surveillance of dangerous areas by law enforcement and fire departments, as well as transport of goods, and other applications. The wide variety of applications outside the military sphere will result in growing civilian and government fleets that will create substantial privacy, safety, security and regulatory hurdles that must be overcome before UAVs can be integrated successfully and safely within our current systems. Privacy is the most cited public concern regarding UAVs. The ability of UAS vehicles' to "loiter" for long periods of time, and thus draw in significantly more information, potentially posing a more serious threat to privacy than do manned flights. Safety concerns include potential air collisions, ground collisions and overall system reliability. UAVs have been increasingly in the news with events ranging from a small UAV crashing at the U.S. Open grounds to more severe cases of firefighters being stalled because of UAVs in the area of a fire. The Federal Aviation Administration has also reported a drastic increase in UAV sightings by pilots. Security issues include hackers taking over control of the UAV, and the potential for terrorists to use UAVs as flying missiles or to carry dangerous payloads. Non-military UAVs are vulnerable to a range of cyber-attacks because they typically rely on unencrypted data links for command, control and navigation. Hackers have the capability to jam, intercept and manipulate the UAVs' controls.

The FAA has mandated the registration of all UAVs weighing over half a pound. Anyone who owns a small unmanned aircraft that weighs more than 0.55 lbs. (250 g) and less than 55 lbs. (25 kg) must register with the Federal Aviation Administration's UAS registry before they fly outdoors. People who do not register could face civil and criminal penalties. Registration requires the name and address of the UAV owner, as well as the manufacturer and model number. Although no current federal rules explicitly govern when a UAV is trespassing or violating privacy, the Federal Aviation Administration has created regulations aimed at limiting their use in public places and around large crowds. In addition to registration, the rules include requirements that the aircraft is kept within sight of the pilot, and bans flying them near stadiums, large crowds and airports. The FAA has also threatened fines for UAV pilots who endanger the flights of other aircraft or interfere in emergency areas like wildfires. One of the problems with the enforcement of current and future regulations is that there is no current system for identifying UAVs and their owners when the UAV is in flight.

There is a need to be able to identify the owners of UAVs that are violating FAA regulations or acting suspiciously such as hovering over large crowds in public events or flying towards a no fly zone without prior notice and to possibly take down the UAV or command it to land or fly back to its base or point of origin.

SUMMARY

The following presents a simplified summary of the specification in order to provide a basic understanding of some aspects of the specification. This summary is not an extensive overview of the specification. It is intended to neither identify key or critical elements of the specification nor delineate the scope of the specification. Its sole purpose is to present some concepts of the specification in a simplified form as a prelude to the more detailed description that is presented later.

The systems and methods disclosed herein, in one aspect thereof, can facilitate the identification of a target UAV at a location. The identification may include receiving location information of the target UAV and then transmitting the location information of the target UAV to a telecommunication network. A request may be made to the telecommunication network to search a database for location information and identification information of the target UAV. Identification information for the telecommunication module of the target UAV based on the location information is then received and transmitted.

In accordance with another aspect of the systems and methods disclosed herein identification of a target UAV may be accomplished by storing telecommunication module information from a plurality of telecommunication modules in a data store at a telecommunications network wherein each of the plurality of telecommunication modules is associated with a UAV and wherein the telecommunication module information includes location information, subscriber information and device information. A request to search the data store for identification information about a target UAV based on location information of the target UAV is then received. The data store is then searched for a telecommunication module located at a location equivalent to the location information of the target UAV. The telecommunication module for the target UAV is then identified and device and subscriber information associated with the target UAV is extracted and transmitted.

In accordance with another aspect of the systems disclosed herein a system for identifying a UAV is disclosed. The system includes a processor; and at least one subsystem that stores telecommunication module information in a data store at a telecommunications network from a plurality of telecommunication modules each associated with a UAV wherein the telecommunication module information includes location information, subscriber information and device information. The subsystem receives a request to search the data store for information about a target UAV based on location information of the target UAV and then searches the data store for a telecommunication module located at a location equivalent to the location information of the target UAV. The subsystem then identifies the telecommunication module for the target UAV, extracts the subscriber information and device information about the target UAV, and transmits the subscriber information.

DETAILED DESCRIPTION OF ILLUSTRATIVE EMBODIMENTS

Figure 1:
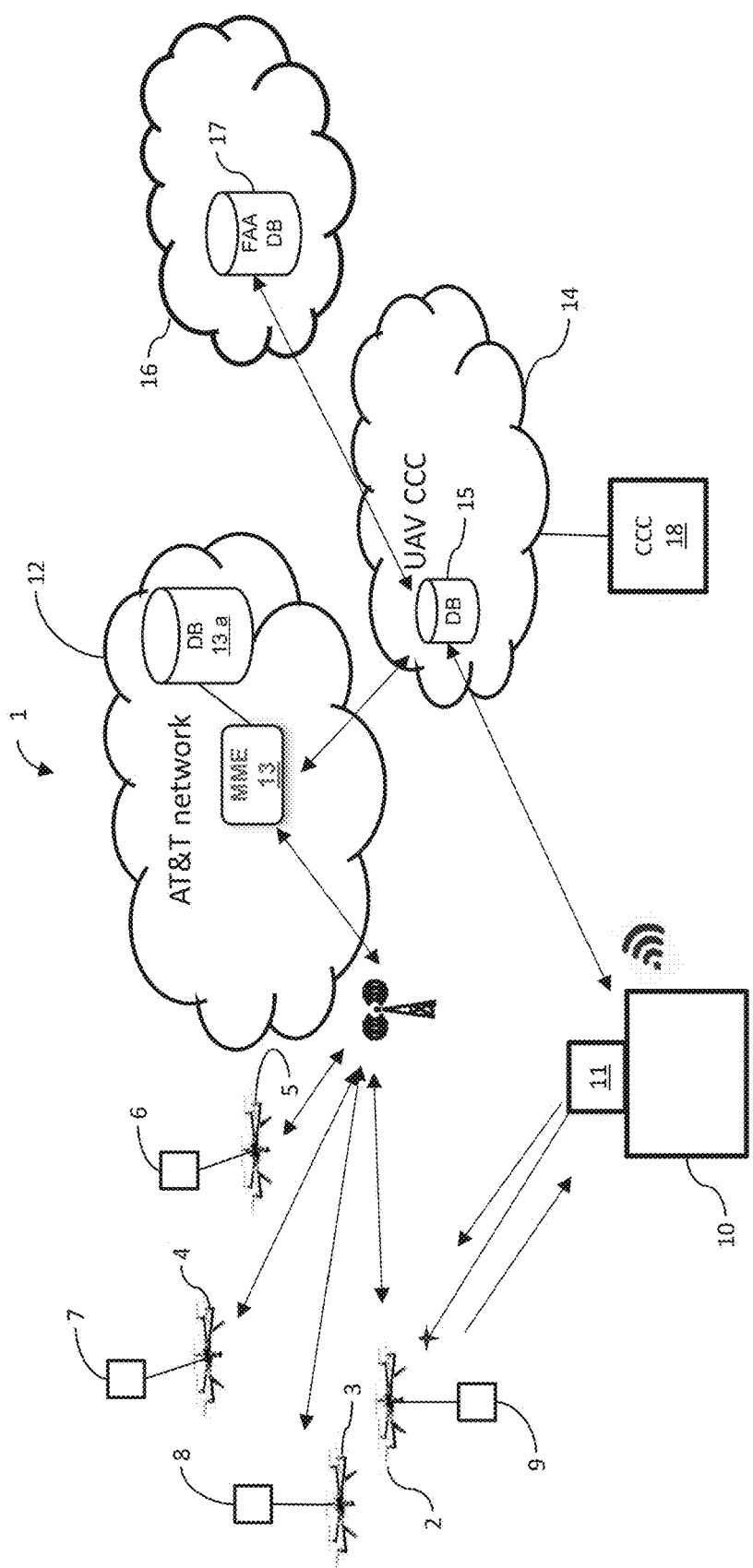
FIG. 1 illustrates a system for identifying and controlling a UAV accordance with an embodiment of the present disclosure.

Illustrated in FIG. 1 is a UAV identification system 1 for identifying and controlling a target UAV 2 operating among a plurality of UAVs, for example UAV 3, UAV 4, and UAV 5.

Associated with each UAV (including target UAV 2, and UAV 3, UAV 4, and UAV 5) is a telecommunication module (TM) (TM 6, TM 7, TM 8, and TM 9) such as, for example, an LTE module. Other telecommunication modules may be used such as for example modules that use the following protocols: WiFi, Bluetooth, ZigBee, Zwave, 6LowPAN, Thread, LoRaWAN, Sigfox, Neul and 2G/3G/4G cellular. TM 6, TM 7, TM 8, and TM 9 store identifier information such as the international mobile station identifier (IMSI) which may be used to extract subscriber identification; and the mobile station international ISDN number (MSISDN) which is a number uniquely identifying a subscription in a GSM or UMTS mobile network. Each IMSI uniquely identifies the telecommunication module (e.g. TM 6, TM 7, TM 8, and TM 9), its home wireless network, and the home country of the home wireless network. In other embodiments, TM 6, TM 7, TM 8, and TM 9 may also store information about the respective target UAV 2, and UAV 3, UAV 4, and UAV 5, such as for example the UAV serial number, manufacturer and make.

The UAV identification system 1 may include user equipment 10 including a beam device 11. The user equipment 10 may include a processor (not shown) to process the information gathered by the beam device 11. In one embodiment the beam device 11 may be a Light Detection and Ranging device (LIDAR). LIDAR measures target range using reflected light. The beam device 11 determines target range and speed based on the time-of-flight of laser light pulses reflected off a target. The beam device 11 can be subdivided into three key sub-components: an opto-mechanical scanner, a ranging unit, and a control processing unit. The opto-mechanical scanner is a precision-engineered device that can generate a consistent stream of laser pulses, which are ultimately fed to the ranging unit. These laser pulses are reflected off of a mirror (either rotating or scanning) within the ranging unit and thereby transmitted to the target. Also within the ranging unit is an electro-optical receiver which records the total laser transmission/reception travel time and communicates this value to the processor of the user equipment 10. In other embodiments other ranging devices may be used such as for example radar or sonar devices.

The UAV identification system 1 may also include a telecommunication network 12 such as a 3G or 4G LTE network including a mobility management entity (MME) 13. MME 13 can manage mobility, User Equipment (UE) identities and security parameters. In a typical LTE network, the MME 13 may be employed for idle mode UE tracking and paging procedure including retransmissions, bearer activation and/or deactivation process. Mobility management allows the telecommunication network 12 to track the location of TM 6, TM 7, TM 8, and TM 9. For example, telecommunication network 12 may be a cellular network of individual base stations. Each base station covers a small geographical area which is part of a uniquely identified location area. The telecommunication network 12 may provide location-based services for determining where a telecommunication module is located. The location information may be stored in a data store 13 a associated with MME 13, such as a home subscriber service data store. For an LTE network a number of technologies for tracking location are available, these include satellite based positioning, mobile radio cellular positioning, hybrid methods and control plane and user plane session handling. In one embodiment, telecommunication network 12 may ascertain the location of the various telecommunication modules (TM 6, TM 7, TM 8 and TM 9) through multilateration of radio signals between (several) radio towers of the network and the telecommunication module. This technology is based on measuring power levels and antenna patterns and uses the concept that a powered telecommunication module always communicates wirelessly with one of the closest base stations, so knowledge of the location of the base station implies the telecommunication module is nearby. Advanced systems determine the sector in which the telecommunication module is located and roughly estimate also the distance to the base station. Further approximation can be done by interpolating signals between adjacent antenna towers. Qualified services may achieve a precision of down to 50 meters in urban areas where mobile traffic and density of antenna towers (base stations) is sufficiently high. Alternately, if the UAV is equipped with a GPS module the telecommunication module may be configured to send GPS information to the telecommunication network 12. The telecommunication network 12 may include processors (not shown) that process the telecommunication network data.

The UAV identification system 1 may also include a command and control center network (CCC network 14) having a CCC data store 15. The CCC network 14 may include processors to process information and data of the CCC network 14. CCC network 14 may communicate with telecommunication network 12 to request location updates for telecommunication modules such as TM 6, TM 7, TM 8, and TM 9 which correspond to the location of the corresponding UAVs such as target UAV 2, UAV 3, UAV 4, and UAV 5.

The UAV identification system 1 may also include an FAA network 16 having an FAA data store 17. The FAA network 16 may include processors to process the information and data of the FAA network 16. FAA data store 17 may store UAV registration data such as the owner's name, physical address, mailing address, email address, UAV manufacturer, model and serial number.

In operation the beam device 11 of the UAV identification system 1 is directed to a target UAV (for example target UAV 2) that the operator would like to identify. By itself, the beam device 11 is not capable of recognizing or calculating coordinates of the reflected laser points. In order to extrapolate a three dimensional coordinate from the range signal produced by the beam device 11, there is a need to locate the beam device 11 with respect to a coordinate system, and then extrapolate the range (distance) measured to a precise location on the ground. In an embodiment of a UAV identification system 1, beam device 11 may direct a laser beam that is reflected from the target UAV 2 that is used to measure the distance, speed and direction of target UAV 2. Beam device 11 or user equipment 10 may be provided with a GPS module for determining the location of the beam device 11. From the location of beam device 11 the internal logic of beam device 11 may determine an approximate location of target UAV 2.

The approximate location of target UAV 2 is transmitted to CCC network 14 which includes computer systems (not shown) that access the CCC data store 15 where a database containing the approximate location of the telecommunication modules (e.g. TM 6, TM 7, TM 8, and TM 9) of the UAVs may be stored. The location information may be obtained from the telecommunication network 12. Telecommunication network 12 may store information about the location of the various telecommunication modules in an area (e.g. TM 6, TM 7, TM 8 and TM 9).

CCC network 14 may access the FAA network 16 which includes computer equipment (not shown) capable of searching an FAA data store 17 containing information about the manufacturer, model number, name of the owner and address of the owner of registered UAVs. The information about target UAV 2 is returned to the CCC network 14 and stored in CCC data store 15. The CCC network 14 then transmits the information about target UAV 2 to user equipment 10 so that the user of beam device 11 has the identification information of target UAV 2 which may include the owner's name and address, the manufacturer and model of the UAV.

Figure 2:
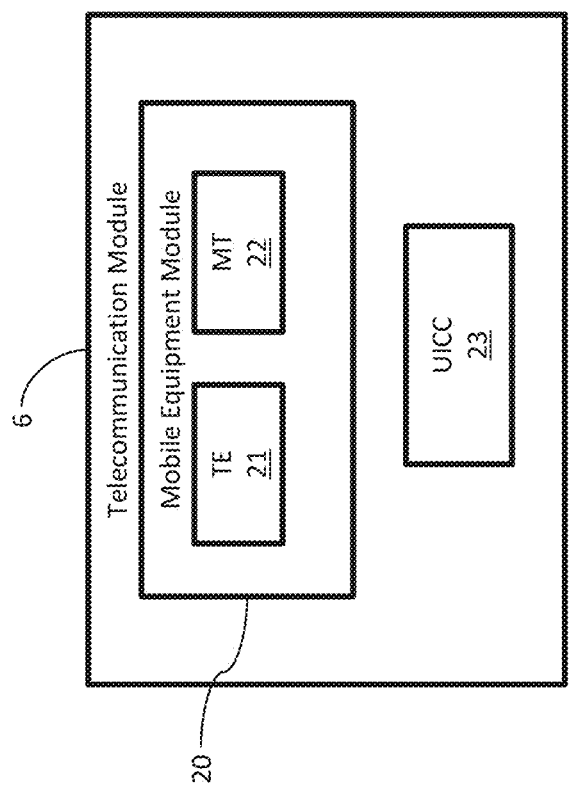
FIG. 2 illustrates a telecommunication module in accordance with an embodiment of the present disclosure.

Illustrated in FIG. 2 is a TM 6 (for example an LTE module) which may include a mobile equipment module 20 having a terminal equipment component 21 and a mobile terminal 22. Terminal equipment component 21 is the point where all data streams start and end, and mobile terminal 22 handles all 3G communication functions. TM 6 may also include a universal integrated circuit card (UICC) 23 that is a smart card that holds the subscriber identity, performs security algorithms and stores the authentication and encryption keys and subscription information.

The utility of an embodiment of the present disclosure may be illustrated with the following scenario. A target UAV 2 may be flying dangerously close to a public event and law enforcement needs to identify the target UAV, and with proper authentication they need to land or move the UAV to a safe distance. The user can use user equipment 10 that has a built in beam device 11 to point at the target UAV. Beam device 11 will be able determine the speed, distance, and direction of the UAV. User equipment 10 may be provided with GPS capability so that it is capable of determining its own longitude and latitude and transmit the information gathered by the beam device from the UAV (Speed, distance, direction) together with its own GPS location to a regional command and control center 18 connected to the CCC network 14. Alternately, the user equipment 10 may include a subsystem that calculates the location of the target UAV from the location of the user equipment 10, and the distance and direction of the target UAV with reference to the location of the user equipment 10. If there is only one UAV within that given limited area, the regional command and control center 18 will be able to determine the UAVs subscription information by querying the telecommunication network 12. The regional command and control center 18 may then access the FAA data store 17 through FAA network 16 to obtain the registration information of the UAV and identify the owner of the UAV. The regional command and control center 18 may then send back to the user equipment 10 all the necessary information needed to interact and move the UAV from the area. This will include either interacting directly with the UAV with proper authentication given from the CCC network 14 and commands needed to move or land the UAV by simply calling the owner to have them move the UAV away from the area. If there is more than one UAV in the immediate area, there is a need to identify a specific UAV. The regional command and control center 18 may request that the telecommunication network 12 initiate an area location update and with minimal interaction and/or interruption of UAVs in the immediate area, get the location of UAVs in the sky in that area and be able to identify the target UAV 2 which needs to be interacted with.

Figures 3, 4:
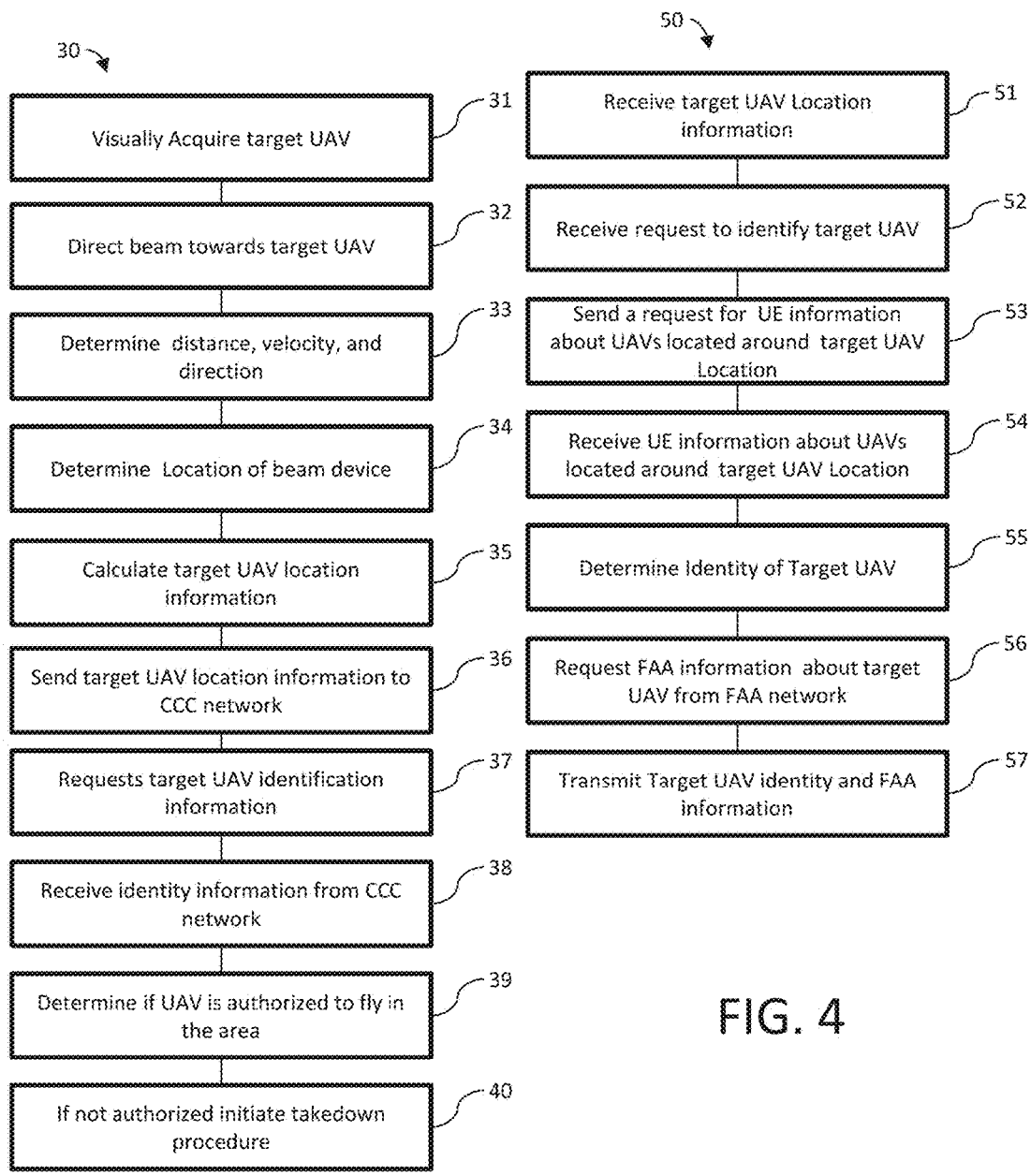
FIG. 3 is a flowchart of the steps of a method for identifying and controlling a UAV to be implemented by a user in accordance with an embodiment of the present disclosure.
FIG. 4 is a flowchart of the steps of a method for identifying and controlling a UAV to be implemented by a command and control network in accordance with an embodiment of the present disclosure.

Illustrated in FIG. 3 is an embodiment of a method 30 to identify a UAV that may be implemented by the user equipment 10 having a beam device 11.

In step 31 the user may be visually acquire the target UAV.

In step 32 the user may direct a beam (such as a laser beam from a LIDAR device) towards the target UAV.

In step 33 the user equipment 10 determines the distance, velocity, and direction of the target UAV.

In step 34 the user equipment 10 utilizes a built-in GPS component to determine the location of the user equipment 10.

In step 35 the user equipment 10 may calculate the target UAV location information based on the location information for the beam device 11 and the distance velocity and direction information for the UAV.

In step 36 the user equipment 10 may send the location information of the target UAV 2 to the CCC network 14

In step 37 the user equipment 10 may request identification information for the target UAV 2 from the CCC network 14.

In step 38 the user equipment 10 may receive identity information of the target UAV 2 from the CCC network 14.

In step 39 the user may determine if the target UAV 2 is authorized to fly in the area.

In step 40 if the target UAV is not authorized to fly in the area the user may initiate appropriate takedown procedures.

Illustrated in FIG. 4 is an embodiment of a method 50 to identify a UAV that may be implemented by a regional command and control center 18 through CCC network 14.

In step 51, CCC network 14 receives location information for the target UAV 2.

In step 52 CCC network 14 receives a request to identify the target UAV 2.

In step 53 CCC network 14 sends a request to the telecommunication network 12 for user equipment information for UAVs located near the location of target UAV 2.

In step 54 CCC network 14 receives user equipment location and subscriber information for UAVs located near the target UAV 2.

In step 55 the CCC network 14 determines the identity of the target UAV.

In step 56 the CCC network 14 may request registration information about the target UAV from the FAA network 16.

In step 57 the CCC network 14 may transmit the target UAV identity and FAA registration information to the user equipment 10.

Although in the embodiment described above, there is a description of telecommunication network 12 and CCC network 14 as separate networks, the two networks may be consolidated into a single network with the functionality of CCC network 14 being embedded in the telecommunication network 12.

Figures 5, 6:
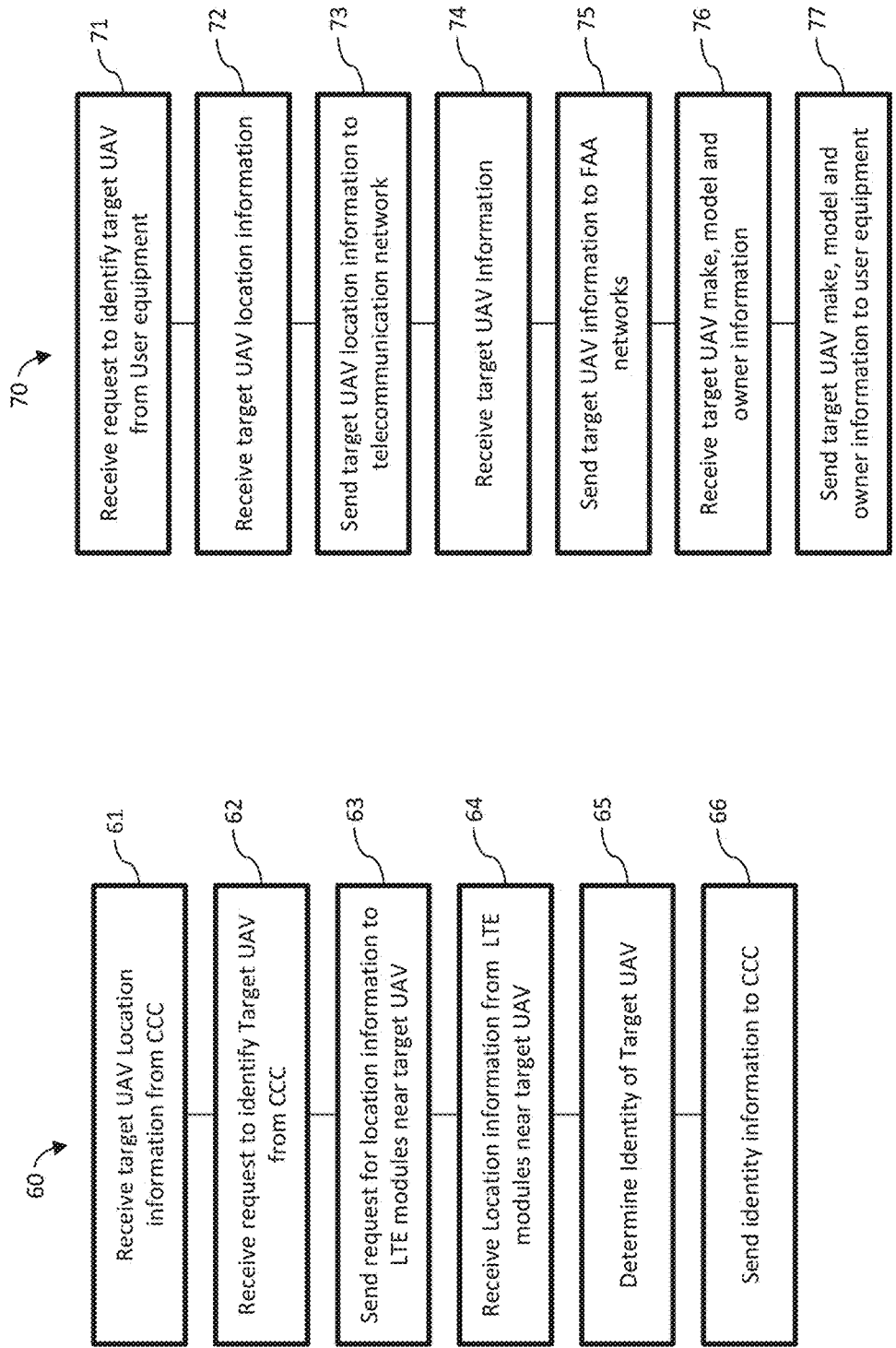
FIG. 5 is a flowchart of the steps of a method for identifying and controlling a UAV to be implemented by a telecommunication network in accordance with an embodiment of the present disclosure.
FIG. 6 is a flowchart of the steps of a method for identifying and controlling a UAV to be implemented by a command and control center network in accordance with an embodiment of the present disclosure.

Illustrated in FIG. 5 is an embodiment of a method 60 to identify a UAV that may be implemented by the telecommunication network 12.

In step 61 the telecommunication network 12 receives information about the location of UAVs.

In step 62 the telecommunication network 12 receives a request to identify a target UAV 2.

In step 63 the telecommunication network 12 sends a request for location information to UAV telecommunication modules (TM 6, TM 7, TM 8 and TM 9) near the target UAV 2.

In step 64 the telecommunication network 12 receives location information from the telecommunication modules TM 6, TM 7, TM 8, and TM 9.

In step 65 the telecommunication network 12 may identify target UAV by comparing the location information of the target UAV 2 with the location information of the telecommunication modules TM 6, TM 7, TM 8, and TM 9. Alternately, the telecommunication network 12 may transmit the location information and subscription information of the telecommunication modules TM 6, TM 7, TM 8, and TM 9 to the CCC network 14 so that the determination of the identity of the target UAV 2 may be accomplished by the CCC network 14.

In step 66 the telecommunication network 12 may transmit the subscription information of the target UAV 2 to the CCC network 14.

Illustrated in FIG. 6 is an embodiment of a method 70 to identify a UAV that may be implemented by the CCC network 14.

In step 71 the CCC network 14 receives a request to identify a target UAV 2 from user equipment 10.

In step 72 the CCC network 14 receives location information of the target UAV 2 from user equipment 10.

In step 73 the CCC network 14 sends the target UAV 2 location information to the telecommunication network 12.

In step 74 the CCC network 14 receives target UAV 2 subscription information from the telecommunication network 12.

In step 75 the CCC network 14 sends the target UAV 2 subscription information to the FAA network 16.

In step 76 the CCC network 14 receives the target UAV 2 registration information which may include the make, model and owner information from the FAA network 16.

In step 77 the CCC network 14 sends the target UAV 2 registration information to the user equipment 10.

Figure 7:
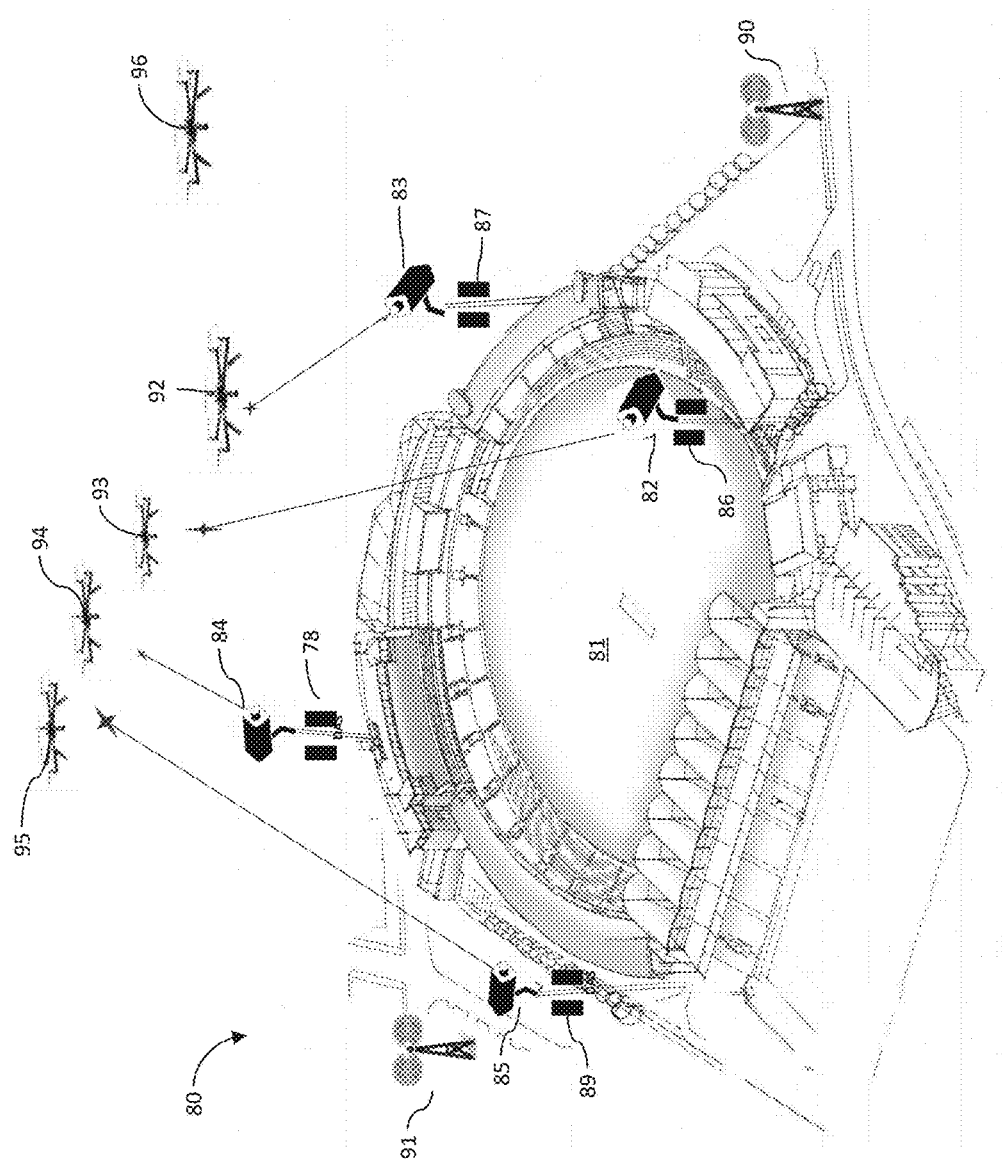
FIG. 7 illustrates the implementation of a system for identifying and controlling a UAV in a stadium in accordance with an embodiment of the present disclosure.

Illustrated in FIG. 7 is an example of an implementation of a stadium UAV identification system 80. Stadium UAV identification system 80 is implemented in a stadium 81 where a plurality of cameras integrated with beam devices (BD), BD 82, BD 83, BD 84, and BD 85 are dispersed throughout the periphery of the stadium 81. Associated with each camera is a distributed antenna system (DAS) (DAS 86, DAS 87, DAS 88, and DAS 89). DAS 86, DAS 87, DAS 88 and 89 comprise a network of spatially separated antenna nodes connected to a common source by a transport medium that provides wireless service within a geographic area or structure. DAS 86, 87, 88 and 89 may be connected to a telecommunication network (such as telecommunication network 12 in FIG. 1) through a plurality of evolved base stations (such as eNodeB 90 and eNodeB 91). The stadium UAV identification system 80 would use the cameras integrated with BD 82, BD 83, BD 84 and BD 85 to scan above the location for any flying objects such as UAVs 92, 93, 94 and 95. The stadium UAV identification system 80 may also include a Patrol UAV 96 as part of sensory array. When a target UAV (e.g. UAV 92) is discovered, a beam device (e.g. BD 82) may be directed towards the target UAV 92 to obtain telemetry (distance, speed, location). The telemetry information is transmitted to a regional command and control center (e.g. regional command and control center 18 in FIG. 1) that receives the identity information from a telecommunication network 12. The regional command and control center 18 may then query the FAA network 16 for registration information associated with target UAV 92. In case the presence of 92 is unauthorized, the user will take appropriate action.

Figure 8:
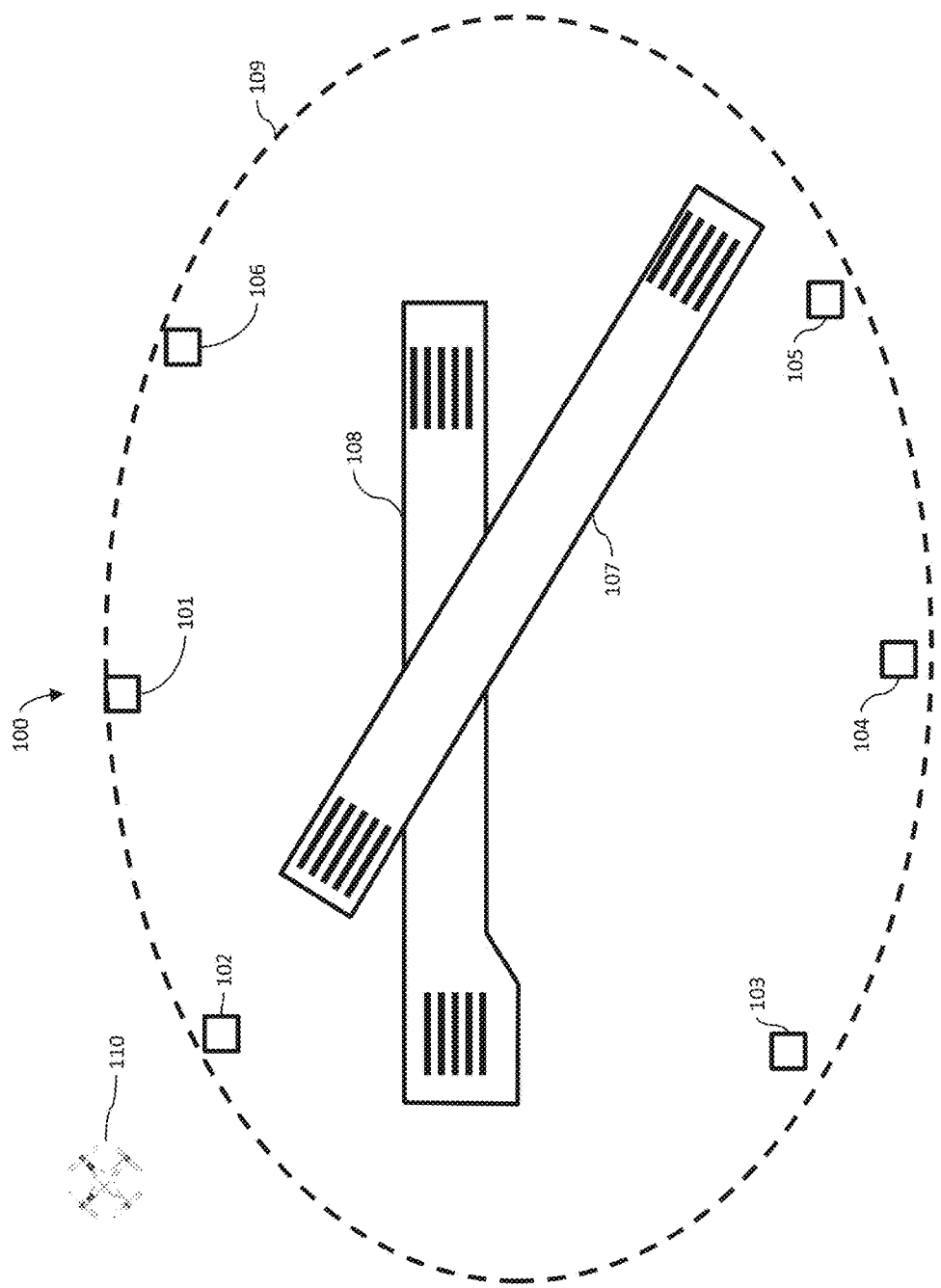
FIG. 8 illustrates implementation of a system for identifying and controlling a UAV in an airport in accordance with an embodiment of the present disclosure.

Illustrated in FIG. 8 is an example of an implementation of an airport UAV identification system 100. The system includes a plurality of beam devices 101, 102, 103, 104, 105, and 106 disposed around the periphery of an area including runways 107 and 108. The plurality of beam devices 101-106 define a UAV no-fly zone 109. In operation, the airport UAV identification system 100 may detect a UAV 110 flying in proximity to the UAV no-fly zone 109. The airport UAV identification system 100 may initiate a method for identifying the UAV 110 by providing location of UAV 110 to a command and control center (e.g. CCC network 14 in FIG. 1). The appropriate authorities may then be provided with the registration information for the target UAV. Upon receipt of the registration information the user may make a determination as to whether UAV 110 poses a threat. If it is determined that UAV 110 poses a threat then appropriate takedown procedures may be initiated.

A number of takedown systems have been developed to takedown unauthorized UAVs. One such system is a device that sends out an electromagnetic field meant to intercept the most popular GPS and ISM radio frequencies, which are used to control UAVs. Other approaches such as directed energy weapons, lasers and kinetic weapons have been used by the military to takedown UAVs. Other systems use electronic jamming to jam the control signals to the target UAV. Yet another takedown procedure is to hack the controls of the UAV and fly it to a safe location.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips), optical disks (e.g., compact disc (CD), digital versatile disc (DVD), blu-ray disc (BRD)), smart cards, and flash memory devices (e.g., card, stick, key drive). Additionally it should be appreciated that a carrier wave can be employed to carry computer-readable electronic data such as those used in transmitting and receiving electronic mail or in accessing a network such as the internet or a local area network (LAN). Of course, those skilled in the art will recognize many modifications may be made to this configuration without departing from the scope or spirit of the disclosed subject matter.

As used in this specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

Terms such as "store," "data store," "data storage," "database," "repository," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed:

1. A method for identifying a target unmanned aerial vehicle comprising:
receiving at a command and control center from a telecommunication network subscription information and location information about approximate locations of telecommunication modules on a plurality of unmanned aerial vehicles;
storing the telecommunication network subscription information and location information in a command and control center data store;
receiving target location information about a location of the target unmanned aerial vehicle having a target telecommunication module from a user equipment;
accessing the command and control center data store;
determining target subscription information of the target unmanned aerial vehicle from the command and control center data store; and
requesting target unmanned aerial vehicle identification information from an FAA network.

2. The method of claim 1 further comprising transmitting the target unmanned aerial vehicle identification information to the user equipment.

3. The method of claim 1 wherein the target unmanned aerial vehicle identification information comprises target unmanned aerial vehicle owner name and address.

4. The method of claim 1 further comprising initiating takedown procedures for the target unmanned aerial vehicle.

5. The method of claim 1 further comprising determining if the target unmanned aerial vehicle is authorized to be present at the location of the target unmanned aerial vehicle.

6. The method of claim 1 wherein the target location information is obtained by a beam device associated with the user equipment.

7. The method of claim 1 further comprising taking control of the target unmanned aerial vehicle.

8. A method comprising:
detecting a target unmanned aerial vehicle flying in a zone;
determining distance, velocity and direction information of the unmanned aerial vehicle using a laser beam device;
determining a location for the laser beam device;
calculating a target unmanned aerial vehicle location from the distance velocity and direction information of the unmanned aerial vehicle and the location for the laser beam device;
providing the target unmanned aerial vehicle location information to a command and control center;

requesting, from the command and control center, identification of the unmanned aerial vehicle from the vehicle location;

receiving identification information of the target unmanned aerial vehicle from the command and control center, wherein the identification information comprises identification of the owner of the target unmanned aerial vehicle from a telecommunication network and FAA registration information from an FAA data store;

determining whether the target unmanned aerial vehicle is authorized to be flying in the zone; and initiating a takedown procedure if the target unmanned aerial vehicle is not authorized to be flying in the zone.

9. The method of claim 8 wherein initiating the takedown procedure comprises sending out signals to intercept a radio frequency used to control the target unmanned aerial vehicle.

10. The method of claim 8 wherein the identification information is derived from an international mobile station identifier associated with a telecommunication module on the target unmanned aerial vehicle.

11. The method of claim 8 wherein detecting the target unmanned aerial vehicle comprises detecting the target unmanned aerial vehicle using a plurality of cameras integrated with beam devices.

12. A system for identifying a target unmanned aerial vehicle (UAV) comprising:

a processor;

a memory coupled to the processor and configured to store program instructions executable by the processor to:

receive at a command and control center from a telecommunication network subscription information and location information about approximate locations of telecommunication modules on a plurality of unmanned aerial vehicles;

store the subscription information and location information in a command and control center data store;

receive target location information about a location of the target unmanned aerial vehicle having a target telecommunication module from a user equipment;

access the command and control center data store;

determine target subscription information of the target unmanned aerial vehicle from the command and control center data store; and request target unmanned aerial vehicle identification information from an FAA network.

13. The system of claim 12 wherein the program instructions executable by the processor further comprise instruction to transmit the target unmanned aerial vehicle identification information to the user equipment.

14. The system of claim 12 wherein the program instructions executable by the processor further comprise program instructions executable by the processor to initiate takedown procedures for the target unmanned aerial vehicle.

15. The system of claim 12 wherein the program instructions executable by the processor further comprise program instructions executable by the processor to take control of the target unmanned aerial vehicle.

16. The system of claim 12 wherein the program instructions executable by the processor to receive target location information comprises comprise program instructions executable by the processor to receive target location information from a beam device.

17. The system of claim 12 wherein the program instructions executable by the processor further comprise program instructions executable by the processor to determine if the target unmanned aerial vehicle is authorized to be present at the location of the target unmanned aerial vehicle.

* * * * *